(12) United States Patent
Higo et al.

(10) Patent No.: US 12,084,332 B2
(45) Date of Patent: Sep. 10, 2024

(54) PRODUCTION SYSTEM

(71) Applicant: Suntory Holdings Limited, Osaka (JP)

(72) Inventors: Tatsutoshi Higo, Osaka (JP); Naoki Furukawa, Osaka (JP); Takahiro Matsuzaki, Ayase (JP); Yohei Shirakawa, Tokyo (JP)

(73) Assignee: SUNTORY HOLDINGS LIMITED, Osaka (JP)

(*) Notice: Subject to any disclaimer, the term of this patent is extended or adjusted under 35 U.S.C. 154(b) by 0 days.

(21) Appl. No.: 18/017,210

(22) PCT Filed: Jul. 19, 2021

(86) PCT No.: PCT/JP2021/027033
§ 371 (c)(1),
(2) Date: Jan. 20, 2023

(87) PCT Pub. No.: WO2022/019281
PCT Pub. Date: Jan. 27, 2022

(65) Prior Publication Data
US 2023/0294972 A1    Sep. 21, 2023

(30) Foreign Application Priority Data

Jul. 21, 2020   (JP) ................................ 2020-124352

(51) Int. Cl.
*B67B 3/26* (2006.01)
*B67B 3/00* (2006.01)
*B67B 3/20* (2006.01)

(52) U.S. Cl.
CPC ................ *B67B 3/26* (2013.01); *B67B 3/006* (2013.01); *B67B 3/204* (2013.01)

(58) Field of Classification Search
CPC ............ B67B 3/204; B67B 3/006; B67B 3/26
See application file for complete search history.

(56) References Cited

U.S. PATENT DOCUMENTS 11,753,198 B2 * 9/2023 Feilloley ................ B29C 49/78
53/415
11,769,157 B2 * 9/2023 Nakayama ............... B65B 5/02
705/317
(Continued)

FOREIGN PATENT DOCUMENTS

CN        208070420 U   * 11/2018   ........... B65D 51/245
JP      2008-35828 A       2/2008
(Continued)

OTHER PUBLICATIONS

International Search Report dated Oct. 12, 2021, issued in counterpart International Application No. PCT/JP2021/027033 (2 pages).
(Continued)

*Primary Examiner* — Andrew M Tecco
(74) *Attorney, Agent, or Firm* — WHDA, LLP

(57) ABSTRACT

In a production system 100, containers have hollow main bodies 1a having openings at their top parts and caps 1b for closing the openings. The production system 100 includes a conveyor line L for conveying the containers 1, a capper 5 for attaching the caps 1b to the main bodies 1a of the containers 1 on the conveyor line L, a reading apparatus 18 configured to read first information attached to top surfaces of the caps 1b of the containers 1 for identifying the containers 1 on the conveyor line L at one or more predetermined points after the capper 5, and a memory apparatus 52 configured to store linked together the first information of the containers 1, second information attached to the main bodies 1a of the containers 1 for identifying the main bodies 1a, and times at which the containers 1 passed the one or more predetermined points.

6 Claims, 3 Drawing Sheets

(56) References Cited

U.S. PATENT DOCUMENTS

| | | |
|---|---|---|
| 2010/0281829 A1 | 11/2010 | Leu et al. |
| 2011/0023416 A1 | 2/2011 | Leu et al. |
| 2011/0120062 A1 | 5/2011 | Leu et al. |
| 2011/0132489 A1 | 6/2011 | Leu et al. |
| 2014/0230366 A1* | 8/2014 | Leu .................. G16H 20/13 53/131.3 |
| 2019/0084714 A1* | 3/2019 | Lindner ............... B41J 11/0095 |

FOREIGN PATENT DOCUMENTS

| | | | | |
|---|---|---|---|---|
| JP | 2008035828 A | * | 2/2008 | |
| JP | 2011184080 A | * | 9/2011 | |
| JP | 2012-79020 A | | 4/2012 | |
| JP | 2012-79024 A | | 4/2012 | |
| JP | 2012079020 A | * | 4/2012 | |
| JP | 2012-221356 A | | 11/2012 | |
| JP | 2013-1431 A | | 1/2013 | |
| JP | 2013-75712 A | | 4/2013 | |
| JP | 2013075712 A | * | 4/2013 | |
| JP | 2019117134 A | * | 7/2019 | |

OTHER PUBLICATIONS

Decision of Refusal dated Sep. 28, 2021, issued in counterpart JP Patent Application No. 2020-124352, w/English machine translation (8 pages).

Reconsideration Report before Appeal dated Jan. 20, 2022, issued in counterpart JP Patent Application No. 2020-124352, w/English machine translation (9 pages).

* cited by examiner

PRODUCTION SYSTEM

FIELD

The present application relates to a production system.

BACKGROUND

Known in the past has been a production system for containers for food. For example, PTL 1 discloses a system for producing cans for holding food. In this system, the bottom surfaces of the cans are printed with individual identification information for identifying the cans (for example, the manufacturing numbers or specimen number etc.). Further, in this system, the same bottom surfaces of the cans are printed with product information relating to food contained in the cans (for example, the manufacturing lot numbers, manufacturing plants, dates of manufacture, best consumption dates, etc.) by visible ink. The cans are inspected by various inspection apparatuses and the results of inspection of the cans are stored in a server linked with the above identification information printed on the cans by invisible ink.

CITATIONS LIST

Patent Literature

[PTL 1] Japanese Unexamined Patent Publication No. 2012-79020

SUMMARY OF INVENTION

Technical Problem

Food containers are sometimes comprised of main bodies and caps. In a production system handling such containers, problems can arise in the containers, for example, due to either the main bodies or the caps, or due to the combination of the main bodies and caps. However, in the system of PTL 1, only predetermined surfaces of the containers such as the bottom surfaces are printed with identification information and product information, so when a problem arises, there is a possibility that it would be impossible to identify which of the main bodies and caps the cause of the problem lay or which combination of the main bodies and caps it lay in. For this reason, it may be impossible to quickly identify the cause of the problem.

In consideration of the above-such problem, the present disclosure has as its object the provision of a production system able to improve traceability.

Solution to Problem

One aspect of the present disclosure is a production system of food containers. In the production system the containers have hollow main bodies having openings at their top parts and caps for closing the openings. The production system comprises a conveyor line for conveying the containers, a capper for attaching the caps to the main bodies of the containers on the conveyor line, a reading apparatus configured so as to read first information attached to top surfaces of caps of the containers for identifying the containers at one or more predetermined points after the capper on the conveyor line, and a memory apparatus configured so as to store linked together the first information of the containers, second information attached to the main bodies of the containers for identifying the main bodies, and times when the containers passed one or more predetermined points.

In the production system of one aspect of the present disclosure, the containers have main bodies and caps, the top surfaces of the caps are given first information for identifying the containers as a whole, and the main bodies are given second information for identifying the main bodies in the containers. Therefore, by tracing second information of the main bodies to which the caps having the first information are attached at the capper, it is possible to individually identify the main bodies and caps rather than the containers as a whole. Accordingly, when a problem occurs in a container, it is, for example, possible to identify that the problem occurs at what main bodies or caps, or at what combination of the main body and cap. Furthermore, in the production system of one aspect of the present disclosure, the above first information, second information, and times when the containers passed one or more predetermined points are stored linked together in the storage apparatus. Therefore, it is possible to easily trace which points a large number of containers having problems passed at a specific time and possible to quickly identity the cause of the problem. Accordingly, the traceability can be improved. Further, the containers having the main bodies and caps are usually conveyed with the top surfaces of the caps facing a fixed direction (for example, upward). Accordingly, by attaching the first information to the top surfaces of the caps, it is possible to easily read the first information.

The production system may further comprise a first apparatus configured so as to attach the first information to the top surfaces of the caps on the conveyor line. In this case, it is possible to attach the first information to the containers on the conveyor line.

The first apparatus may attach the first information to the top surfaces of the caps by invisible ink unable to be viewed under visible light. The first information is used for tracing when containers passed points on a conveyor line, so the first information, for example, need not be made visible to the consumers etc. Therefore, by attaching the first information to containers by invisible ink, it is possible, for example, to improve the design look of the containers.

The production system may further comprise a second apparatus configured so as to attach second information to the main bodies on the conveyor line. In this case, it is possible to attach second information to the containers on the conveyor line.

The production system may further comprise a plurality of inspection apparatuses arranged on the conveyor line. Reading apparatuses may be configured so as to read the first information at a plurality of predetermined points corresponding to the plurality of inspection apparatuses. In this case, it is possible to identify the times at which containers pass the inspection apparatuses. Therefore, it is possible to further improve the traceability of the containers.

Advantageous Effects of Invention

According to one aspect of the present disclosure, it is possible to provide a production system for containers able to improve traceability.

DESCRIPTION OF EMBODIMENTS

Below, referring to the attached drawings, production systems according to embodiments will be explained. Similar or corresponding elements will be assigned the same reference signs and overlapping explanations will be omitted. To facilitate understanding, sometimes the scale of the figures have been changed.

Figure 1:
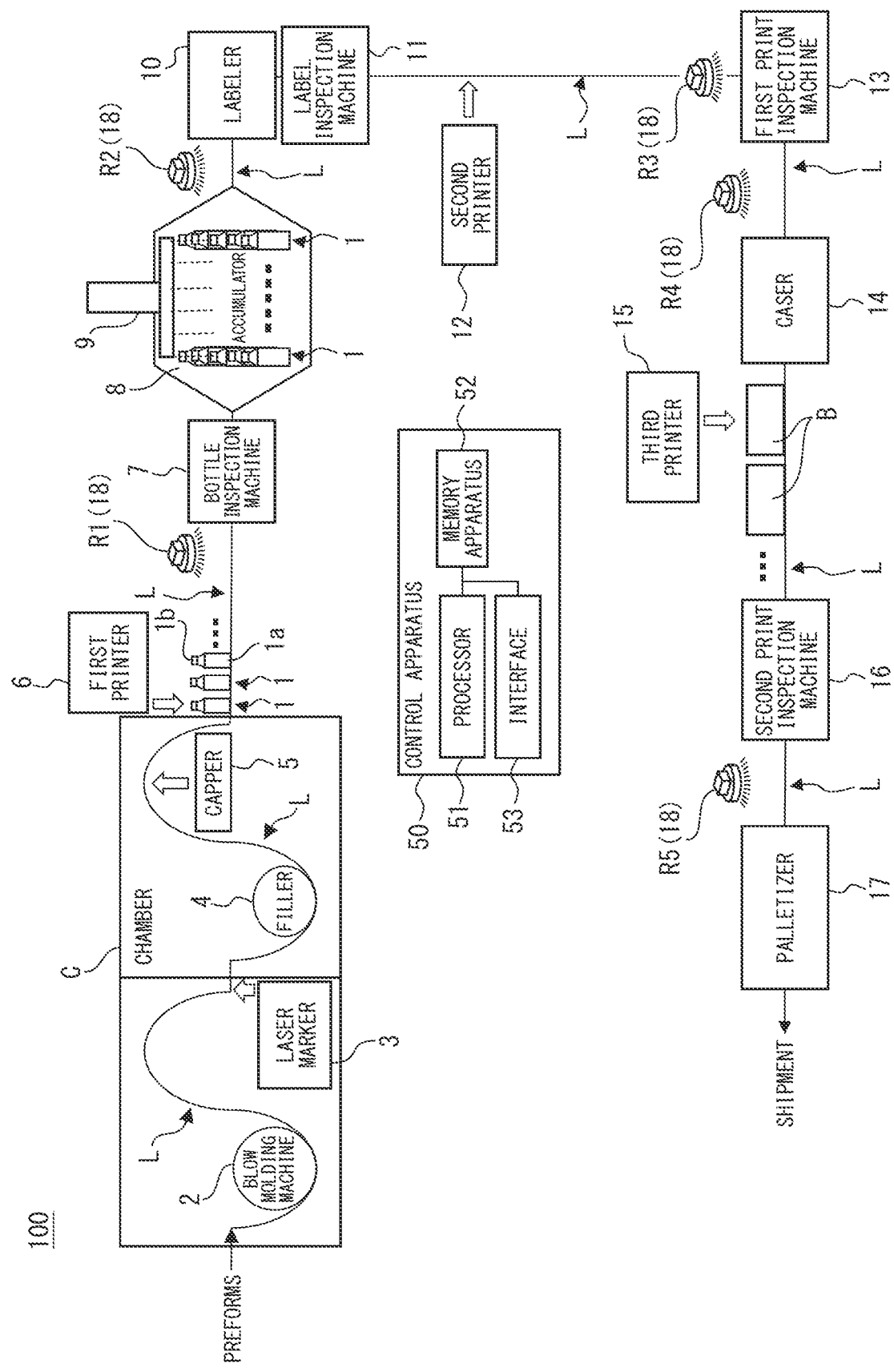
FIG. 1 is a schematic view showing a production system according to an embodiment.

FIG. 1 is a schematic view showing a production system according to an embodiment. In the production system 100, as containers for holding food, plastic bottles 1 for holding a beverage are manufactured. Note that, in this Description, "plastic bottles" mean bottles made of plastic such as polyethylene terephthalate (PET), polypropylene (PP), and polyethylene (PE). It should be noted that they are not limited to PET bottles. The containers may also be beverage containers other than plastic bottles (for example, metal cans or glass bottles). Further, the containers may be containers for holding food other than beverages (for example, health foods, enriched foods, general foods, etc.). In this Description, "food" can mean all food and beverages (except drugs, quasi-drugs, and regenerative medical products as prescribed for example in Japan's Act on Securing Quality, Efficacy, and Safety of Drugs, Medical Devices, Etc.).

Figure 2:
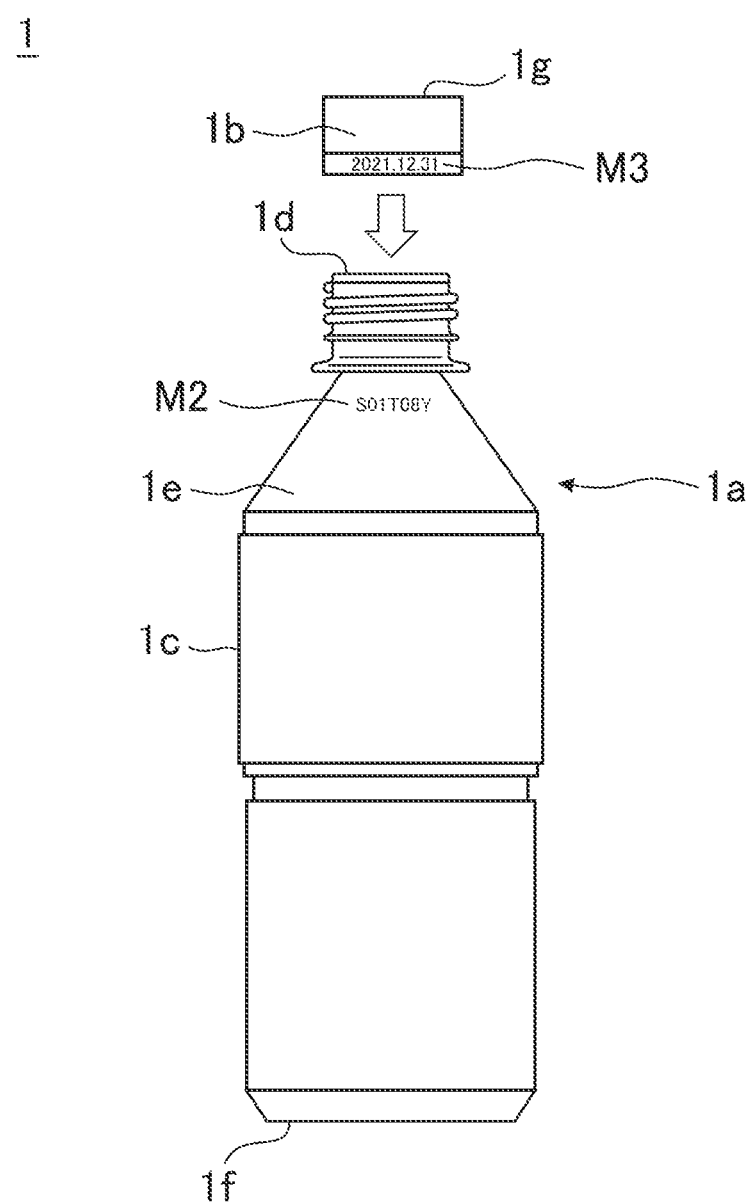
FIG. 2 is a schematic front view showing one example of a container.
Figure 3:
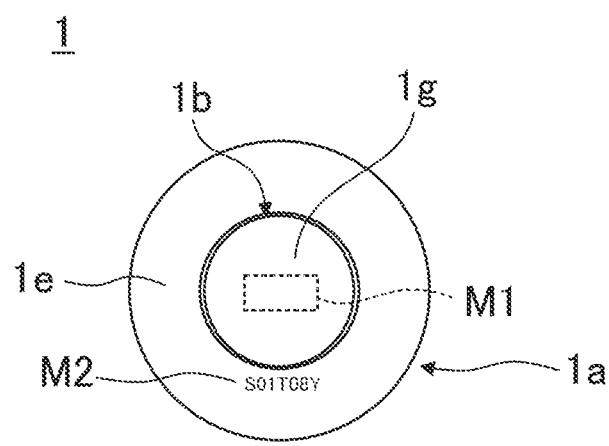
FIG. 3 is a schematic plan view of the container of FIG. 2.

FIG. 2 is a schematic front view showing one example of a container, while FIG. 3 is a schematic plan view of the container of FIG. 2. Referring to FIG. 2, the plastic bottle 1 manufactured by the production system 100 has a main body 1a, cap 1b, and label 1c. The main body 1a has a generally hollow cylindrical shape and has a mouth part 1d at the top end part, a barrel part 1e below the mouth part 1d, and a bottom part 1f closing a bottom end part of the barrel part 1e. Around the outer circumference of the mouth part 1d, a male screw is formed for screwing with a female screw of the cap 1b. The mouth part 1d has an opening for filling a beverage and for drinking it.

Referring to FIG. 3, the cap 1b (for example, the top surface 1g of the cap 1b) is given first information M1. Further, referring to FIG. 2, the main body 1a (for example, the side surface of the barrel part 1e) is given second information M2. Further, the cap 1b (for example, the side surface of the cap 1b) is given third information M3 (the first information M1, second information M2, and third information M3 will be described in detail later).

Referring to FIG. 1, the production system 100 for manufacturing the above such plastic bottles 1 comprises a conveyor line L, blow molding machine 2, laser marker (second apparatus) 3, filler 4, capper 5, first printer (first apparatus) 6, bottle inspection machine 7, accumulator 8, temperature regulation apparatus 9, labeler 10, label inspection machine 11, second printer (third apparatus) 12, first cross mark inspection machine 13, caser 14, third printer 15, second print inspection machine 16, palletizer 17, and reading apparatus 18. The reading apparatus 18 has a first reader R1, second reader R2, third reader R3, fourth reader R4, and fifth reader R5. Further, the production system 100 further comprises a control device 50 configured so as to control all or part of the above component elements. The production system 100 may further comprise other component elements.

The conveyor line L can, for example, be configured so as to convey plastic bottles 1 from the blow molding machine 2 to the palletizer 17. For example, the conveyor line L may be configured so as to convey plastic bottles 1 in a single line in the section up to the caser 14 except at specific areas (for example, the accumulator 8 etc.). The conveyor line L may also have various conveyor apparatuses. For example, in the entire section or partial section from the blow molding machine 2 to the chamber C, the conveyor line L may have a plurality of rotating wheels having grippers for individually holding the main bodies 1a of the plastic bottles 1 (gripper conveyance). Further, for example, in the entire section or partial section from the exit of the chamber C to the palletizer 17, the conveyor line L may have a plurality of conveyors (for example, belt conveyors). The conveyor line L may also have other types of conveyor apparatuses.

The blow molding machine 2 manufactures the main bodies 1a of the plastic bottles 1 from preforms. For example, the blow molding machine 2 may form the main bodies 1a by the stretch blow molding process. For example, in the blow molding machine 2, the preforms are heated then inserted into the molds. Next, the preforms are stretched in the height direction by stretch rods and stretched in the width direction by pressurized air. Then, when the preforms swell to the desired shapes, the inside surfaces of the preforms are cooled by cold air. Finally, the main bodies 1a are taken out from the molds.

The laser marker 3 is configured so as to attach the second information M2 for identifying the main bodies 1a to the main bodies 1a. In the present embodiment, the laser marker 3 is arranged on the conveyor line L in front of the filler 4. Therefore, the second information M2 is attached to the main bodies 1a before the beverage is filled in the main bodies 1a. For example, in another embodiment, so long as the control device 50 can identify the order of the main bodies 1a, the laser marker 3 may attach the second information M2 to the main bodies 1a at any position of the conveyor line L (for example, any position between the blow molding machine 2 to the accumulator 8 to which the main bodies 1a are conveyed in a certain order). For example, the laser marker 3 may be arranged on the conveyor line L downstream from the first printer 6. Referring to FIG. 2, for example, the laser marker 3 is configured so as to print the second information M2 on the side surfaces of the barrel parts 1e of the main bodies 1a. Therefore, the second information M2 can be viewed under visible light. The second information M2 can include any symbols enabling differentiation of the main bodies 1a (for example, letters, numbers, shapes, or combinations of these etc.). The second information M2 may also, for example, include serial numbers of the manufacturing facilities, manufacturing lot numbers and so on. Referring to FIG. 1, for example, the second information M2 attached to the main bodies 1a by the laser marker 3 can be assigned by the processor 51 of the control device 50 and can be stored in the memory apparatus 52. Further, it should be noted that the second information M2 may also be attached to the main bodies 1a by an apparatus other than the laser marker (for example, an ink jet printer etc.) so long as the second information can be viewed under visible light.

The filler 4 is configured so as to fill a beverage in the main bodies 1a. The filler 4 can have filling ports of one or more beverages. If the filler 4 has a plurality of filling ports, the control device 50 can grasp which filling ports filled the beverages in the main bodies 1a. Specifically, for example, as explained above, in the section from the blow molding machine 2 to the inside part of the chamber C, the plastic bottles 1 can be conveyed by the grippers of rotating wheels. The number of grippers of the rotating wheels is known.

Further, the rotating wheels can be driven by servo motors controlled by the control device 50. Therefore, the control device 50 can judge by what grippers of what rotating wheels the plastic bottles 1 having specific second information M2 are held and, furthermore, what filling ports the grippers are assigned to. Therefore, the memory apparatus 52 can be configured so as to store linked the second information M2 of the main bodies 1*a* and the serial numbers of the filling ports filling beverages in the main bodies 1*a*. The beverage contained in the main bodies 1*a* can be various beverages (for example, water, coffee, tea, cocoa, juice, soup, alcoholic beverages and nonalcoholic beverages and so on). The capper 5 is configured so as to close by the caps 1*b* the mouth parts 1*d* of the main bodies 1*a* in which the beverage is filled. The filler 4 and the capper 5 are arranged at the inside part of the sterilized chamber C. At the inside part of the chamber C, other component elements (for example, a rinser etc.) may be further arranged.

After the chamber C as well, the plastic bottles 1 can be conveyed by the conveyors in the above way. While being conveyed by the conveyors, the plastic bottles 1 are placed on the conveyors so that the top surfaces 1*g* of the caps 1*b* face upward.

The first printer 6 is configured so as to attach the first information M1 for identifying the plastic bottles 1 to the plastic bottles 1. The first printer 6 is arranged on the conveyor line L behind the capper 5 and in front of the first inspection machine 7 (for example, the exit of the chamber C). For example, the first printer 6 may also be configured so as to attach the first information M1 to the plastic bottles 1 held at the final gripper of the final rotating wheel inside of the chamber C or to the plastic bottles 1 right after that. For example, the first printer 6 can be an ink jet printer.

Referring to FIG. 3, for example, the first information M1 is configured so as to be printed by invisible ink on the top surfaces 1*g* of the caps 1*b*. The invisible ink can, for example, be ink emitting fluorescent light when irradiated by ultraviolet light. Therefore, the first information M1 cannot be viewed under visible light. The first information M1 can include any symbols enabling differentiation of the plastic bottles 1 (for example, letters, numbers, shapes, or combinations of these and so on). For example, the first information M1 can be printed as a plurality of dots arranged two-dimensionally. The plurality of dots can, for example, be converted to certain numerical values. In another embodiment, the first information M1 can be viewed under visible light. For example, the first information M1 may be printed on the top surfaces 1*g* of the caps 1*b* (for example, by the laser marker). For example, in the case where the containers are metal cans having pull tabs, the first information M1 can contact the lips of the consumers, so the first information M1 may also be embossed.

Referring to FIG. 1, the first information M1 attached to the plastic bottles 1 by the first printer 6 can be assigned by the processor 51 of the control device 50 and can be stored in the memory apparatus 52 linked with the second information M2 attached to the main bodies 1*a*. Specifically, in the above way, the control device 50 can judge by what grippers of what rotating wheels the plastic bottles 1 having specific second information M2 are held in the chamber C. Further, as explained above, the first printer 6 can be configured so as to attach the first information M1 to the plastic bottles 1 held by the final gripper in the chamber C or the plastic bottles 1 right after them, so the control device 50 can grasp what second information M2 is attached to the plastic bottles 1 arranged at the first printer 6. Therefore, the control device 50 can link the first information M1 and the second information M2 of the plastic bottles.

The first reader R1 is arranged corresponding to the bottle inspection machine 7 and is configured so as to read the first information M1 attached to the plastic bottles 1. The first reader R1 can be arranged at the conveyor line L so as to detect the times when the plastic bottles 1 pass the bottle inspection machine 7 (for example, right before or right after the bottle inspection machine 7). For example, the first reader R1 can include an ultraviolet light emitting apparatus for reading the first information M1 printed by invisible ink. Further, for example, the first reader R1 can include any camera configured so as to detect fluorescent light which the invisible ink emits (for example, CCD camera or CMOS camera). The first information M1 of the plastic bottles 1 read by the first reader R1 is sent to the control device 50. The times when the plastic bottles 1 pass the first reader R1 (that is, substantially the times when the plastic bottles 1 pass the bottle inspection machine 7) are stored in the memory apparatus 52 linked with the first information M1.

The bottle inspection machine 7 is configured so as to inspect the caps for dirt, scratches, immersion line, etc. The inspection results of the plastic bottles 1 at the bottle inspection machine 7 are sent to the control device 50 and stored in the memory apparatus 52 linked with the first information M1 of the plastic bottles 1.

The accumulator 8 is a buffer area for temporarily holding the plastic bottles 1. A single line of a plurality of plastic bottles 1 enters the accumulator 8 and is randomly divided into a plurality of lines inside the accumulator 8. Further, when the plastic bottles 1 exit the accumulator 8, the plurality of lines of plastic bottles 1 are randomly returned to a single line. At this time, the plurality of lines of plastic bottles 1 are not returned to a single line in the same order as when entering. Therefore, the plurality of plastic bottles 1 exit the accumulator 8 in an order different from the time of entry. Further, the accumulator 8 may have a temperature regulation apparatus 9 arranged in it. The temperature regulation apparatus 9 can, for example, be a warmer or cooler and is configured so as to discharge cold water, ordinary temperature water, or hot water so as to change the temperature of the beverage in the plastic bottles 1 to ordinary temperature. Alternatively or additionally, the accumulator 8 may have a sterilization apparatus arranged in it.

The second reader R2 is arranged corresponding to the labeler 10 and the label inspection machine 11 and is configured so as to read the first information M1 attached to the plastic bottles 1. The second reader R2 can be arranged on the conveyor line L so as to detect the times when the plastic bottles 1 passed the labeler 10 and the label inspection machine 11 (for example, right in front of the labeler 10, between the labeler and the label inspection machine 11, or right after the label inspection machine 11). For example, the second reader R2 can be configured in the same way as the above first reader R1. The first information M1 of the plastic bottles 1 read by the second reader R2 is sent to the control device 50. The times when the plastic bottles 1 passed the second reader R2 (that is, substantially the times when the plastic bottles 1 passed the labeler 10 and the label inspection machine 11) are stored in the memory apparatus 52 linked with the first information M1.

The labeler 10 is configured so as to attach the labels 1*c* to the main bodies 1*a* of the plastic bottles 1. For example, the labeler 10 can be configured so as to wrap the labels 1*c* round the main bodies 1*a*. The label inspection machine 11 is configured so as to inspect the labels 1*c* attached to the main bodies 1*a* (for example, the positions of the labels 1*e* etc.). The inspection results of the plastic bottles 1 at the label inspection machine 11 are sent to the control device 50 and are stored in the memory apparatus 52 linked with the first information M1 of the plastic bottles 1.

The second printer 12 is configured so as to attach the third information M3 to the plastic bottles 1. For example, the second printer 12 may be arranged on the conveyor line L after the label inspection machine 11. The second printer 12 may also be arranged at another position of the conveyor line L. Referring to FIG. 2, for example, the second printer 12 can be an ink jet printer and can be configured so as to print the third information M3 on the side surfaces of the caps 1*b*. The third information M3 can be viewed under visible light. The third information M3, for example, can be information relating to food contained in the containers. For example, it can include at least one of the manufacturing date, best consumption date, and manufacturing lot number. Referring to FIG. 1, the third information M3 attached by the second printer 12 to the plastic bottles 1 can be determined by the processor 51 of the control device 50. The third information M3 can be stored in the memory apparatus 52 linked with at least one of the first information M1 and the second information M2.

The third reader R3 is arranged corresponding to the first print inspection machine 13 and is configured so as to read the first information M1 attached to the plastic bottles 1. The third reader R3 can be arranged on the conveyor line L so as to detect the times when the plastic bottles 1 passed the first print inspection machine 13 (for example, right before or right after the first print inspection machine 13). For example, the third reader R3 can be similarly configured as the first reader R1 and the second reader R2. The first information M1 of the plastic bottles 1 read by the third reader R3 is sent to control device 50. The times when the plastic bottles 1 passed the third reader R3 (that is, substantially the times when the plastic bottles 1 passed the first print inspection machine 13) are stored in the memory apparatus 52 linked with the first information M1.

The first print inspection machine 13 is configured so as to inspect the printing attached to the plastic bottles 1 (for example, the positions of the third information M3 attached to the caps 1*b* etc.) The inspection results of the plastic bottles 1 at the first print inspection machine 13 are sent to the control device 50 and stored in the memory apparatus 52 linked with the first information M1 of the plastic bottles 1.

The fourth reader R4 is arranged corresponding to the caser 14 and is configured so as to read the first information M1 attached to the plastic bottles 1 entering the caser 14 (for example, right before the caser 14). The caser 14 packages pluralities of plastic bottles 1 in cases B (for example, carton boxes etc.) A single line of plastic bottles 1 may be divided into a plurality of lines before entering the caser 14. In this case, for example, the fourth reader R4 may be configured so as to read the first information M1 of the plastic bottles 1 before the single line of plastic bottles 1 is divided into the plurality of lines. Alternatively, for example, the fourth reader R4 may be configured so as to read the first information M1 of plastic bottles 1 divided into a plurality of lines. For example, the fourth reader R4 can be similarly configured as the first reader R1, the second reader R2, and the third reader R3. The first information M1 of the plastic bottles 1 read by the fourth reader R4 is sent to the control device 50. Therefore, the control device 50 can grasp the first information M1 of the pluralities of plastic bottles contained in the cases B.

The third printer 15 is configured so as to attach to the cases B fourth information for identifying the cases B. For example, the third printer 15 can be arranged on the conveyor line L after the caser 14. For example, the third printer 15 can be an ink jet printer and the fourth information can be viewed under visible light. The fourth information can include any symbols enabling differentiation of the cases B (for example, letters, numbers, shapes, or combinations of these and so forth). Further, the fourth information may include other information (for example, at least one of the first information M1, the second information M2, and the third information M3 of the plastic bottles 1 contained in the cases B). The fourth information attached to the cases B by the third printer 15 can be determined by the processor 51 of the control device 50 and is stored in the memory apparatus 52 linked with at least one of the first information M1 and second information M2 of the plastic bottles 1 contained in the cases B.

The second print inspection machine 16 is configured so as to inspect the printing applied to the cases B (for example, the positions of fourth information attached to the cases B). The inspection results of the cases B at the second print inspection machine 16 may be sent to the control device 50 or may be stored in the memory apparatus 52 linked with the fourth information of the cases B.

The fifth reader R5 is arranged corresponding to the palletizer 17 and is configured so as to read the fourth information attached to the cases B entering the palletizer 17 (for example, right before the palletizer 17). The palletizer 17 stacks a plurality of cases B on the pallets. A single line of cases B may be divided into a plurality of lines before entering the palletizer 17. In this case, for example, the fifth reader R5 may be configured so as to read the fourth information of the single line of cases B before the single line of cases B is divided into the plurality of lines. Alternatively, for example, the fifth reader R5 may be configured so as to read the fourth information of the cases B divided into the plurality of lines. For example, the fifth reader R5 may be any camera configured so as to detect visible ink (for example, a CCD camera or CMOS camera). The fourth information of the cases B read by the fifth reader R5 is sent to the control device 50. The fourth information of the plurality of cases B stacked on the pallets by the palletizer 17 is stored in the memory apparatus 52. The pallets may be given fifth information for identifying the pallets. The fifth information can be determined by the processor 51 of the control device 50 and stored in the memory apparatus 52 linked with the fourth information of the cases B contained at the pallets. After that, the pallets can be shipped outside of the production system 100.

The control device 50 is configured so as to control all or some of the above component elements and can communicate with these component elements by cables or wirelessly. For example, the control device 50 can include one or more PLCs (Programmable Logic Controllers) and/or PCs (Personal Computers) etc. For example, the control device 50 includes the processor 51, memory apparatus 52, and interface 53. The control device 50 may further include other component elements (for example, a display device (for example, a liquid crystal display and/or touch panel etc.) and/or an input device (for example, a mouse, keyboard, touch panel, and/or buttons and so forth)). The component elements of the control device 50 can be connected with each other through a bus etc.

The processor 51 can, for example, include at least one of a CPU, MPU, ASIC, LSI, DSP, or FPGA. The processor 51 can be configured so as to perform various processing in accordance with programs stored in the memory apparatus 52. The memory apparatus 52 can, for example, include at least one of a hard disk and ROM or RAM. The memory apparatus 52 can store programs to be run by the processor 51. Further, the processor 51 can be configured so as to store various information in the memory apparatus 52 linked with the first information M1 of the plastic bottles 1, such as the second information M2 and the third information M3 of the plastic bottles 1 and the fourth information of the cases B including the plastic bottles 1 and the fifth information of the pallets

- the times when the plastic bottles 1 passed each reader R1, R2, R3, R4, and R5
- the inspection results, numerical values, images, and other data at the inspection machines 7, 11, and 13 of the plastic bottles 1
- the pressure of the air at the blow molding machine 2
- the ID numbers of the filling ports at the filler 4 and the amounts of the beverage filled
- the fastening torque of the caps 1b at the capper 5
- the wrapping tension at the labeler 10
- the inspection data of selected samples The memory apparatus 52 can store various other information as well. The interface 53 can, for example, be made an I/O port etc.

In the production system 100 according to the above such embodiment, the plastic bottles 1 have the main bodies 1a and caps 1b. The top surfaces 1g of the caps 1b are given first information M1 for identifying the containers 1 as a whole, while the main bodies 1a are given second information M2 for identifying the main bodies 1a in the containers 1. Therefore, by tracing what second information M2 the main bodies 1a, which the caps 1b having the first information M1 are attached to at the capper 5, have, it is possible to also individually identify the main bodies 1a and caps 1b rather than just the containers 1 as a whole. Accordingly, when a problem arises in containers 1, for example, it is possible to identify at which of the main bodies 1a or caps 1b the problem lies, or at which combination of the main bodies 1a and caps 1b the problem lies. For example, the main bodies 1a and caps 1b can be respectively supplied from several suppliers. In this case, for example, there would be a possibility of the existence of several combinations of the main bodies 1a and caps 1b (combinations of suppliers) in the same lot. Problems might arise in the containers in only a specific combination. In the production system 100, such a combination can be identified. Furthermore, in the production system 100, the above first information M1, second information M2, and times at which the plastic bottles 1 pass points at which the readers R1 to R4 are arranged are stored linked together in the memory apparatus 52. Therefore, it is possible to easily trace what point (reader) the many containers 1 having a problem passed at a specific time and possible to quickly identify the cause of the problem. Accordingly, it is possible to improve the traceability. Further, the plastic bottles 1 having the main bodies 1a and caps 1b are usually conveyed so that the top surfaces 1g of the caps 1b face a predetermined direction (for example, upward). Accordingly, by attaching the first information M1 to the top surfaces 1g of the caps 1b, the first information M1 can be easily read.

Furthermore, the production system 100 further comprises a first printer 6 configured so as to attach the first information M1 to the top surfaces 1g of the caps 1b on the conveyor line L. Therefore, it is possible to attach the first information M1 to the caps 1b on the conveyor line L.

Further, in the production system 100, the first printer 6 attaches the first information M1 to the top surfaces 1g of the caps 1b by invisible ink not able to be viewed under visible light. The first information M1 is used for tracing which points on the conveyor line L the plastic bottles 1 passed at what times, so the first information M1 need not, for example, be visible to the consumers etc. Therefore, by attaching the first information M1 on the plastic bottles 1 by invisible ink, for example, the design look of the plastic bottles 1 can be improved.

Further, the production system 100 further comprises a laser marker 3 configured so as to attach the second information M2 to the main bodies 1a on the conveyor line L. Therefore, it is possible to attach the second information M2 to the main bodies 1a on the conveyor line L.

Further, the production system 100 comprises a plurality of inspection apparatuses 7, 11, and 13 arranged on the conveyor line L. The reading apparatus 18 is configured so as to read the first information M1 at a plurality of predetermined points corresponding to the plurality of inspection apparatuses 7, 11, and 13. Therefore, it is possible to identify the times at which the plastic bottles 1 passed the inspection apparatuses 7, 11, and 13. Therefore, the traceability can be further improved.

Further, in the production system 100, the plurality of plastic bottles 1 exit the accumulator 8 in an order different from when they entered it, so the order of the plastic bottles 1 changes on the conveyor line L. However, the plastic bottles 1 include the first information M1 for identifying the plastic bottles 1. This first information M1 is read by the reading apparatus 18 at predetermined points of the conveyor line. Further, the times when the plastic bottles 1 passed the reading apparatus 18 are stored in the memory apparatus 52 linked with the first information M1 of the plastic bottles 1. Therefore, even if the order of the plastic bottles 1 on the conveyor line L changes, the operator can identify the times at which the plastic bottles 1 passed the points based on the memory apparatus 52. Therefore, the traceability of the plastic bottles 1 can be improved.

For example, in the production system 100, as explained above, the positions of the third information M3 attached to the caps 1b are inspected at the first print inspection machine 13. If it is judged at the first print inspection machine 13 that the positions of the third information M3 are not in the allowable ranges in the caps 1b, the following causes may be considered.

(1) At the blow molding machine 2, the main bodies 1a are not formed to the desired heights, the heights of the mouth parts 1d and caps 1b end up deviating from the desired heights, and, therefore, at the second printer 12, the positions of the third information M3 become off (that is, the blow molding machine 2 has a problem).

(2) At the labeler 10, the labels 1c are wrapped around the main bodies 1a with excessive tension, the heights of the mouth parts 1d and caps 1b end up deviating from the desired heights, and, therefore, at the second printer 12, the positions of the third information M3 become off (that is, the labeler 10 has a problem).

(3) The settings of the second printer 12 were poor (that is, the second printer 12 has a problem).

If it is learned that several plastic bottles 1 having third information M3 attached to unsuitable positions have passed a specific apparatus at a similar time, it can be judged that that apparatus has a problem. However, as explained above, the order of the plastic bottles 1 changes on the conveyor line L, so the order of the plastic bottles 1 at the first print inspection machine 13 can differ from that at other apparatuses. In the production system 100, regarding this point, as explained above, the times when the plastic bottles 1 pass the readers are stored in the memory apparatus 52 linked with the first information M1. Due to this, which apparatuses the several plastic bottles 1 having third information M3 attached to unsuitable positions passed at a similar time can be easily identified by the operator. Therefore, in the production system 100, if for example a defective product is found, it can be possible to easily identify the apparatus having the problem.

An embodiment of a production system of containers was explained, but the present invention is not limited to the above embodiment. A person skilled in the art would understand that various modifications of the above embodiment are possible.

For example, in the above embodiment, the production system 100 is equipped with the first printer 6 on the conveyor line L and first information M1 is attached to the caps 1*b* on the conveyor line L. However, in another embodiment, the first information M1 may also be attached to the caps 1*b* in advance. In this case, instead of the first printer 6, an additional reader having a configuration similar to the first reader R1 can be arranged at the exit of the chamber C whereby the first information M1 can be linked with other information. Further, for example, in the above embodiment, the production system 100 is equipped with the laser marker 3 on the conveyor line L and the second information M2 is attached to the main bodies 1*a* on the conveyor line L. However, in another embodiment, the second information M2 may also be attached to the main bodies 1*a* (preforms) in advance. In this case, instead of the laser marker 3, an additional reader able to read the second information M2 can be set at any position whereby the second information M2 can be linked with other information.

Further, for example, in the above embodiment, the first information M1 is attached to the plastic bottles 1 by invisible ink. However, in another embodiment, the first information M1 may also be attached to the plastic bottles 1 by visible ink.

Further, for example, in the above embodiment, as the containers having the main bodies and caps, plastic bottles 1 are used. However, in another embodiment, the containers may also be glass bottles or metal cans having main bodies and caps. Note that, in the present disclosure, "caps" can mean anything able to close the main bodies after food is filled in them and can include caps which cannot be opened by the consumers. For example, in cans having pull tabs, the main bodies are closed by caps having pull tabs after being filled with food. Such caps with pull tabs normally cannot be detached from the main bodies by the consumers. However, the "caps" of the present disclosure may also include such caps.

REFERENCE SIGNS LIST

1 plastic bottle (container)
1*a* main body
1*b* cap
1*g* top surface of cap
3 laser marker (second apparatus)
6 first printer (first apparatus)
7 bottle inspection machine
11 label inspection machine
13 first cross mark inspection machine
18 reading apparatus
52 memory apparatus
100 production system
L conveyor line
M1 first information
M2 second information

The invention claimed is:

1. A production system of food containers,
in which production system,
the containers have hollow main bodies having openings at their top parts and caps for closing the openings, and
the production system comprises
a conveyor line for conveying the containers,
a capper for attaching the caps to the main bodies of the containers on the conveyor line,
one or more inspection apparatuses arranged on the conveyor line,
a caser packaging a plurality of the containers conveyed on the conveyor line in cases,
a reading apparatus configured so as to read first information attached to top surfaces of caps of the containers for identifying the containers at one or more predetermined points immediately before and/or after the inspection apparatuses, devices for producing the containers for storing food and/or devices for storing food in the containers, and
a memory apparatus configured so as to store linked together the first information of the containers, second information attached to the main bodies of the containers for identifying the main bodies, and times when the containers passed one or more predetermined points, and store fourth information attached to the case and associated with at least one of the first or second information,
wherein the first information is stored in the memory apparatus associating with inspection results from the one or more inspection apparatuses and the devices for producing the containers for storing food and/or the devices for storing food in the containers so that the cause of problem with the containers can be identified in the event of a problem with the container; and
wherein the first information is associated with the fourth information to enable identification of the container and the cases in which the container is contained in the event of a problem with the container.

2. The production system according to claim 1, further comprising a first apparatus configured so as to attach the first information to the top surfaces of the caps on the conveyor line.

3. The production system according to claim 2, wherein the first apparatus is configured so as to attach the first information to the top surfaces of the caps by invisible ink unable to be seen under visible light.

4. The production system according to claim 3, further comprising a second apparatus configured so as to attach the second information to the main bodies on the conveyor line.

5. The production system according to claim 2, further comprising a second apparatus configured so as to attach the second information to the main bodies on the conveyor line.

6. The production system according to claim 1, further comprising a second apparatus configured so as to attach the second information to the main bodies on the conveyor line.

* * * * *